A. S. Blake,
Steel Trap,
№ 23,750. Patented Apr. 26, 1859.
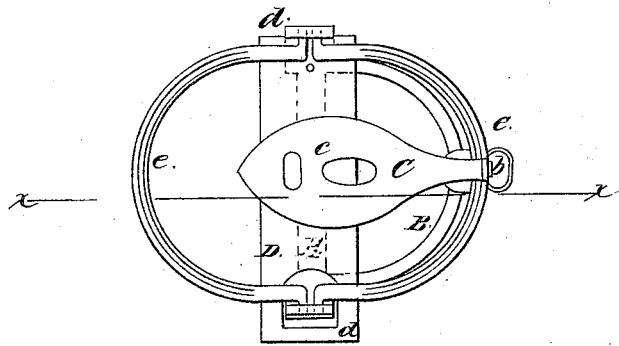
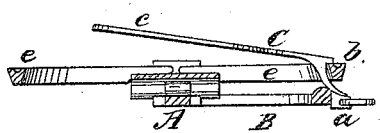
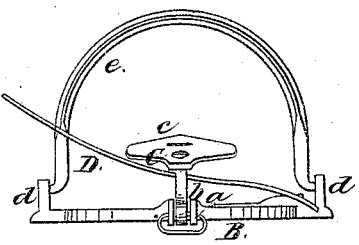
Witnesses:
John J. Jacques
L. Sanford Davies
Inventor:
A. S. Blake

UNITED STATES PATENT OFFICE.

A. S. BLAKE, OF WATERBURY, CONNECTICUT.

ANIMAL-TRAP.

Specification of Letters Patent No. 23,750, dated April 26, 1859.

*To all whom it may concern:*

Be it known that I, A. S. BLAKE, of Waterbury, in the county of New Haven and State of Connecticut, have invented a new and Improved Trap for Catching Rats and other Animals; and I do hereby declare that the following is a full, clear, and exact description of the same, reference being had to the annexed drawings, making a part of this specification, in which—

Figure 1, is a plan or top view of my invention. Fig. 2, a vertical section of do, taken in the line $x, x$, Fig. 1. Fig. 3, a side view of do.

Similar letters of reference indicate corresponding parts in the several figures.

To enable those skilled in the art to fully understand and construct my invention I will proceed to describe it.

A, represents a bar, at one side of which there is a semi-circular or bow-shaped projection B, having the usual catch and bait plate C, attached, the form of which is plainly shown in Fig. 2, the plate being connected by a joint $a$, to the bow B. The catch $b$, being just above the joint. The plate $c$, extends horizontally over the bar A, and has the bait secured to it by means of a string or fine wire as usual.

At each end of the bar A, there is a vertical ledge $d$, which ledges form bearings for the journals of two semi-circular jaws $e, e$, which when in a closed state are side by side, and when distended are laid in a horizontal position at opposite sides of the bar A, as shown plainly in Fig. 1.

To one end of the bar A, a spring D, is attached. This spring may be formed of a steel plate, and of one or more leaves. One end of the spring D, is perforated and the jaws $e, e$, pass through it. The spring D, has a tendency to keep the jaws $e, e$, in a closed state as shown in Fig. 3, and when the jaws are distended or opened they are retained in such position in consequence of the catch $b$, fitting over one of the jaws $e$, the trap being sprung by the animal depressing the plate $e$, either by treading on it or by rubbing the bait thereon.

The bar A, it will be seen is equal in length to the jaws $e, e$, and the spring D, is directly below the jaws $e, e$. The greatest space therefore occupied by the trap is when the jaws are distended, and that is comparatively small, for in the old form of steel trap it will be recollected that the bar A, extends a considerable distance beyond the jaws and that the spring is attached to this bar or shank at the outer side of the jaws instead of below them as in the within described invention. This long shank renders the old trap quite cumbersome and also prevents the trap from being properly concealed and shy or shrewd animals avoid them. The reducing of the dimensions of this form of trap or, the curtailment of the bar A, owing to the position of the spring is a very important feature, for it permits the trap to be placed in vessels, where the animals to be caught, rats for instance, would least suspect anything of the kind, and as they leap or jump into vessels with great celerity, great numbers would be caught that would avoid a trap fully exposed. The invention is also equally applicable for catching other animals, game, and fur, for it admits of being concealed in various ways to entrap animals that could not be caught by other traps. The invention is also valuable as regards the reducing of the cost of transportation. A large number may be packed into a small space and the cost of manufacture is also somewhat reduced.

Having described my invention, I claim and desire to secure by Letters Patent, as an improved article of manufacture:

A trap having its spring D, attached below the jaws ($e, e$) and the spring brought within or nearly within the diameter of the jaws, as and for the purpose herein shown and described.

A. S. BLAKE.

Witnesses:
JOHN J. JACQUES,
L. SANFORD DAVIES.